United States Patent [19]
Langston et al.

[11] Patent Number: 6,074,143
[45] Date of Patent: Jun. 13, 2000

[54] ADJUSTABLE DECKING SYSTEM FOR SUPPORTING FREIGHT

[75] Inventors: Frances J. Langston, Long Beach; Ward C. Burrows, Pasadena, both of Calif.

[73] Assignee: Ancra International LLC, Hawthorne, Calif.

[21] Appl. No.: 09/300,049

[22] Filed: Apr. 27, 1999

[51] Int. Cl.[7] .................................................. B60P 7/08
[52] U.S. Cl. ........................... 410/89; 410/143; 410/146; 410/148
[58] Field of Search .............................. 410/89, 132, 139, 410/144, 145, 146, 148, 150, 143; 248/354.1; 211/105.3, 162, 191, 192, 208; 105/370

[56] References Cited

U.S. PATENT DOCUMENTS

| | | | |
|---|---|---|---|
| 3,071,086 | 1/1963 | Dunlap | 410/146 |
| 3,090,329 | 5/1963 | Rolfe, Jr. | 410/148 |
| 3,095,830 | 7/1963 | Runken | 410/89 |
| 3,116,702 | 1/1964 | Stough | 410/89 |
| 5,338,137 | 8/1994 | Jensen | 410/146 |
| 5,452,972 | 9/1995 | Adams | 410/89 |

Primary Examiner—Stephen T. Gordon
Attorney, Agent, or Firm—Edward A. Sokolski

[57] ABSTRACT

A beam assembly is formed from a hollow beam member which has a pair of slidable channel units installed therein and extend from the opposite ends thereof. The ends of the channel units have guide shoes forming latching assemblies pivotally supported thereon, each guide shoe having a spring loaded lock key mounted pivotally mounted thereon. A pair of tracks are spaced from each other in opposing relationship by a distance equal to the longitudinal extent of the beam member. The tracks have a plurality of aligned apertures and C-shaped runners running along their longitudinal extent. The lock keys of the beam member each has a pair of fingers extending therefrom which fit into a pair of adjacent track apertures. The fingers may be locked in place in the opposing track apertures by the spring action of their associated springs and may be withdrawn from the apertures by way of a tab formed thereon. The guide shoes further have T-shaped portions which engage the C-shaped runners of the tracks to retain the guide shoes on the tracks for vertical movement. A pair of the beam members may thus be raised and lowered on the track and provide support for pallets, planking or the like.

4 Claims, 2 Drawing Sheets

ADJUSTABLE DECKING SYSTEM FOR SUPPORTING FREIGHT

BACKGROUND OF THE INVENTION

1. Field of the Invention

This invention relates to decking systems in which the deck height can be adjusted and more particularly to such a system for use in supporting freight in a vehicle compartment.

2. Description of the Related Art

In vehicles employed for handling freight such as trucks, aircraft and railroad cars, it is often desirable to provide beams, decks, or shelves to support various cargo items. In order to facilitate loading and unloading of such cargo, it is desirable that such cargo support systems be versatile in their positioning and readily relocated from the cargo handling area to a stowage location if need be. In U.S. Pat. No. 5,338,137, inventor: Richard H. Jensen, issued Aug. 16, 1994 and assigned to Ancra International, the assignee of the present application, a decking system is described which employs paired beams for supporting a shelf or for directly supporting cargo containers. In this system, the height of the deck can be raised or lowered by means of latching members which engage apertures formed in opposing vertically support tracks. The device of the present invention is an improvement over this prior art decking system in that it provides dual latching fingers on its guide shoe lock keys which engage a pair of apertures in the tracks, thus distributing the load and providing greater strength. A preferred embodiment of the present system also employs a standard "aircraft" track which has a low profile and is of higher strength and is less prone to fatigue failure. In addition, the present system is of more economical construction than that of the prior art.

SUMMARY OF THE INVENTION

The device of the present invention provides a significant improvement over the prior art by providing a stronger support and simplifying and economizing the design. This end result is achieved by employing a beam assembly formed from a hollow beam member in which a pair of channel units are slidably installed, these channel units extending from the opposite ends of the beam member. A guide shoe is pivotally attached to the ends of each of the channel units, each guide shoe having a spring loaded lock key pivotally supported thereon. A pair of tracks are spaced from each other in opposing relationship by a distance equal to the longitudinal extent of the beam assembly. The tracks have longitudinal rows of aligned apertures formed therein and running along their longitudinal extents. The lock key of each tube has a pair of fingers extending therefrom which fit into a pair of adjacent track apertures. The fingers are locked in place in the track apertures by the spring action of their associated springs and may be withdrawn from the apertures by actuating a tab on each key against the spring action. The effective length of the beam assembly can be adjusted for optimum fitting of the fingers within the apertures of the track by extending or retracting the tube members from or into the beam member. The tracks further have C-shaped portions which engage T-shaped portions of the guide shoes, thereby retaining the beam assembly for slidable vertical positioning along the tracks. A pair of beam members each installed on a separate pair of spaced tracks can thus be used to support, planking, pallets, or the like at selected heights.

It is therefore an object of this invention to provide an improved adjustable decking system for supporting freight at various selected heights.

It is a further object of this invention to provide a more economical and stronger adjustable decking system for supporting freight.

Other objects of the invention will become apparent in view of the following description taken in connection with the accompanying drawings.

DETAILED DESCRIPTION OF THE INVENTION

Figure 1:
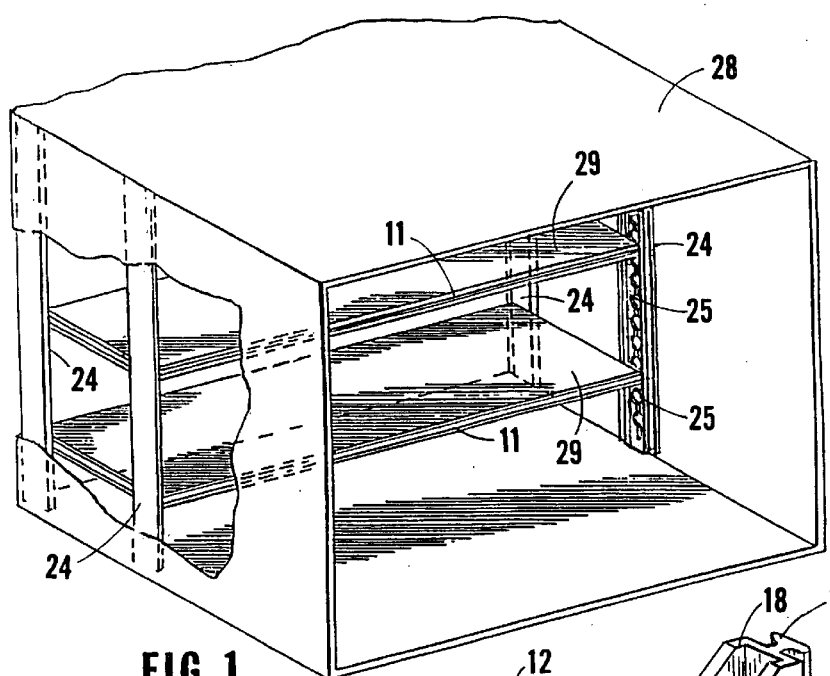
FIG. 1 is a front perspective view showing a typical installation of the system of the invention.
Figure 2:
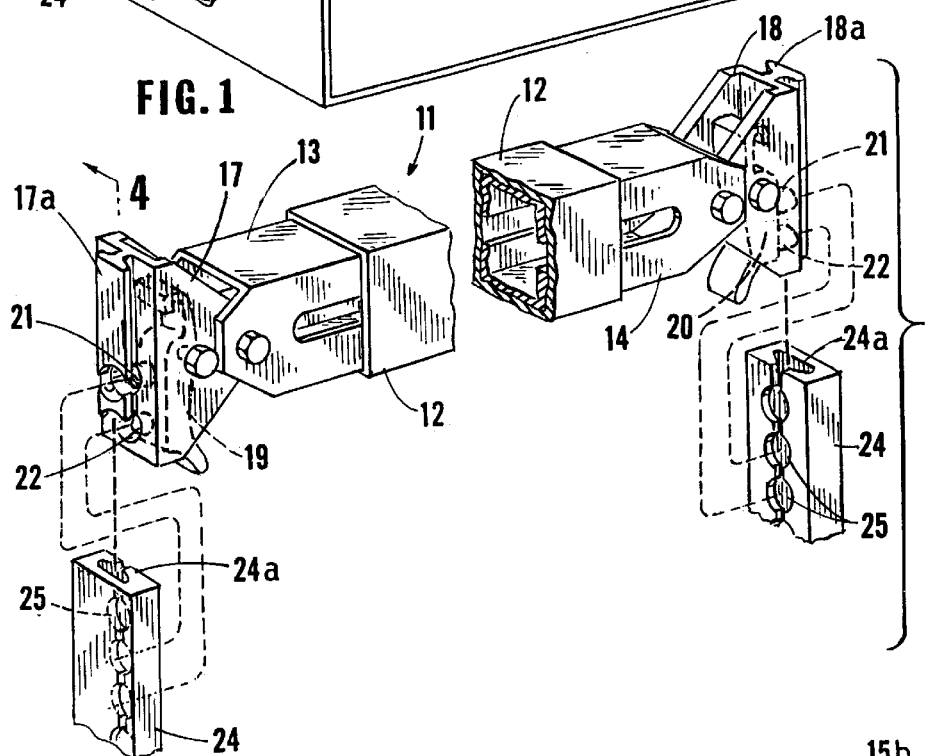
FIG. 2 is a front perspective view of a preferred embodiment of the system of the invention.
Figure 3:
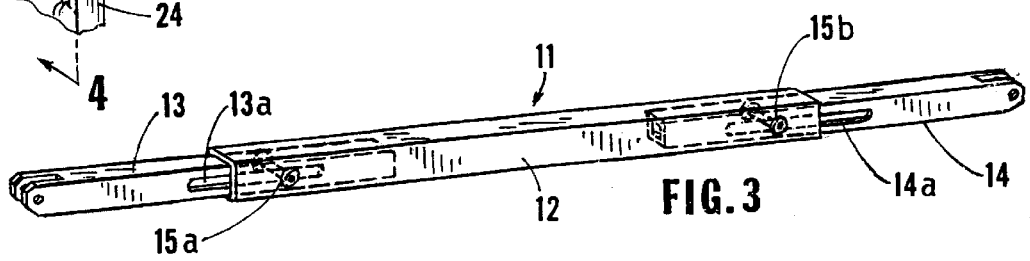
FIG. 3 is a front perspective view of the beam assembly of the preferred embodiment.

Referring now to FIG. 1, the system of the invention is illustrated in a typical installation. Two pairs of tracks 24 are mounted on the side walls of compartment 28, the tracks of each pair being directly opposite each other. Compartment 28 may be the freight carrying compartment of a vehicle such as a truck. The tracks have spaced openings 25 formed therein, these openings being arranged along the longitudinal extent of the tracks.

Supported between tracks 24 are beam assemblies 11. Such beam assemblies, as to be described in detail further on in the specification, can be adjusted to a desired height in engagement with a pair of opposing tracks 24 at a selected pair of track openings 25. By setting a pair of such beams in the forward and rear tracks at the same height, a support for shelves 29 is provided. If so desired, the shelving can be dispensed with and the beam assemblies used to directly support cargo containers or the like.

Referring now to FIGS. 2–5, beam assembly 11 is formed from a hollow beam member 12 in which a pair of similar slidable channel units 13 and 14 are installed, these channel units extending from the opposite ends of the beam member. Pins 15a and 15b extend between the inner walls of beam member 12, each of the channel units having a slot 13a and 14a in which the pins 15a and 15b are fitted.

Figure 4:
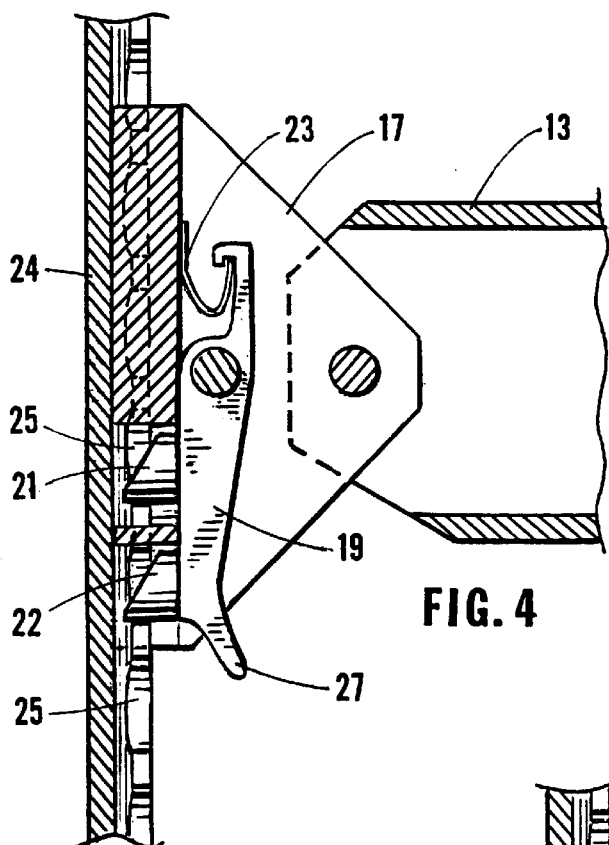
FIG. 4 is a cross sectional taken along the plane indicated by 4—4 in FIG. 2.
Figure 5:
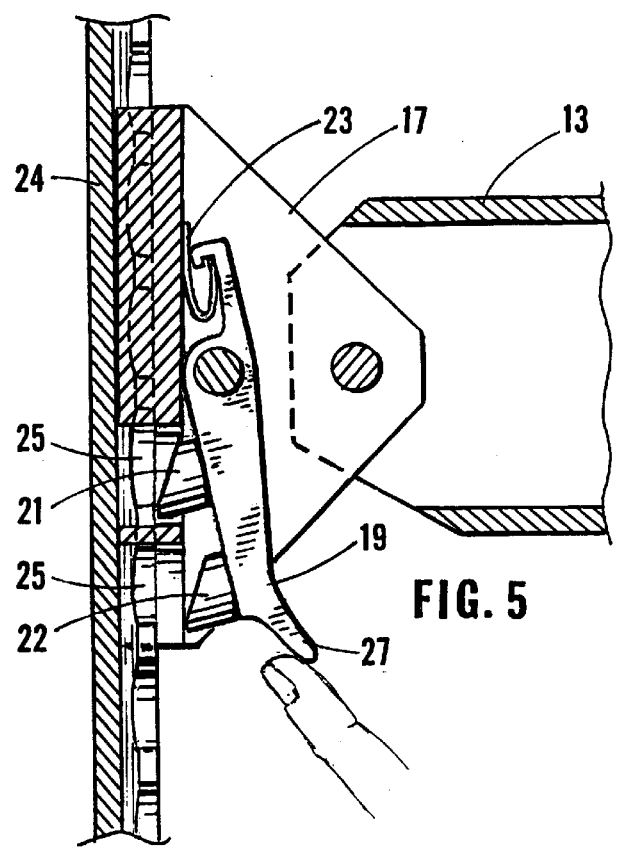
FIG. 5 is a cross sectional view similar to that of FIG. 4 but showing the lock key being retracted.

Guide shoes 17 and 18 are pivotally supported on the ends of tubes 13 and 14, respectively. Lock keys 19 and 20 are respectively pivotally mounted on guide shoes 17 and 18. Each lock key has a pair of fingers 21 and 22 formed thereon. Fingers 21 are circularly shaped to fit into the apertures 25 of track 24, this track being a commercially available track originally utilized in aircraft. The lock keys are urged by leaf springs 23, which are captured at one end of the keys, to retain fingers 21 and 22 within an adjacent pair of apertures 25 formed in track 24. A tab 27 is formed on the end of each lock key to enable retraction of the fingers from the track apertures in changing the height of the beam assembly. Guide shoes 17 and 18 have T-shaped end portions 17a and 18a which matingly engage C-shaped portions 24a of the tracks thereby retaining the beam assembly to the tracks for vertical positioning therealong. Stop members (not shown) are installed in tracks 24 to limit the lower extent of the beam assembly. Referring to FIGS. 4 and 5, FIG. 4 shows a lock key in its fully installed position in retention in the track apertures 25 by virtue of the spring action of spring 23 while FIG. 5 shows the lock key tab 27 being actuated by finger action so as to remove the fingers from the apertures to permit vertical positioning of the beam assembly.

While the preferred embodiment utilizes a track having generally circular apertures with a closed back portion, the device may also be utilized with a track having apertures which run therethrough as shown in U.S. Pat. No. 5,338,137. In such an embodiment, the fingers 21 and 22 have a generally rectangular cross section and fit into successive apertures of the track as shown in U.S. Pat. No. 5,338,137.

While the invention has been described and illustrated in detail it is to be understand that this is intended by way of illustration and example only, the scope of the invention being limited by the terms of the following claims.

We claim:

1. In an adjustable decking system for use in supporting freight in a compartment having opposite walls, such system having a pair of similar tracks with spaced openings and C-shaped runners running therealong, said tracks being mounted on said opposing walls in directly opposing relationship to each other and a beam assembly formed by a pair of channel units and a beam member in which the channel units are telescopically supported for slidable longitudinal motion with one of the ends of each of said channel units protruding from the opposite ends of the beam member respectively, the improvement comprising A guide shoe pivotally attached to each of the protruding ends of said channel units, each of said guide shoes including a spring actuated pivotally supported lock key, each of said lock keys having a pair of fingers extending therefrom which fit into a pair of adjacent track openings, said fingers being latched in place in said openings, each of said guide shoes including a T-shaped member slidably engaging the C-shaped runner of its associated track in mating engagement therewith, said beam assembly being selectively adjustable in height along said opposing tracks by slidably positioning the guide shoes along said tracks to bring the fingers of said lock keys into engagement with a selected pair of opposing track openings.

2. The system of claim 1 wherein said fingers have substantially circular end portions and the track openings are substantially circular.

3. The device of claim 1 wherein said lock keys have tabs formed thereon for use in manually unlatching said fingers from said track openings.

4. The device of claim 2 wherein said lock keys have tabs formed thereon for manually unlatching said fingers from said track openings.

* * * * *